United States Patent
Chen

(10) Patent No.: US 10,543,778 B2
(45) Date of Patent: Jan. 28, 2020

(54) LIGHT ASSEMBLY FOR VEHICLE AND METHOD OF USING THE SAME

(71) Applicant: Ford Global Technologies, LLC, Dearborn, MI (US)

(72) Inventor: Linsheng Chen, Rochester Hills, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 121 days.

(21) Appl. No.: 15/713,833

(22) Filed: Sep. 25, 2017

(65) Prior Publication Data

US 2019/0092226 A1 Mar. 28, 2019

(51) Int. Cl.
| | |
|---|---|
| B60Q 1/32 | (2006.01) |
| F21S 43/40 | (2018.01) |
| F21S 43/31 | (2018.01) |
| F21S 43/14 | (2018.01) |
| F21S 43/20 | (2018.01) |
| F21V 5/04 | (2006.01) |
| G02B 3/02 | (2006.01) |
| G02B 19/00 | (2006.01) |
| G02B 27/30 | (2006.01) |
| F21Y 115/10 | (2016.01) |
| B60R 3/00 | (2006.01) |

(52) U.S. Cl.
CPC .............. *B60Q 1/323* (2013.01); *F21S 43/14* (2018.01); *F21S 43/26* (2018.01); *F21S 43/315* (2018.01); *F21S 43/40* (2018.01); *F21V 5/04* (2013.01); *G02B 3/02* (2013.01); *G02B 19/0061* (2013.01); *G02B 27/30* (2013.01); *B60R 3/002* (2013.01); *F21Y 2115/10* (2016.08)

(58) Field of Classification Search
CPC .. B60Q 1/323; B60Q 1/32; F21V 5/04; F21V 13/04; F21S 43/40
USPC ......................................................... 362/495
See application file for complete search history.

(56) References Cited

U.S. PATENT DOCUMENTS

| | | | |
|---|---|---|---|
| 6,659,629 B2 | 12/2003 | Potter et al. | |
| 7,580,192 B1 | 8/2009 | Chu et al. | |
| 2005/0135109 A1* | 6/2005 | Stout | F21V 5/04 362/509 |
| 2007/0290475 A1* | 12/2007 | Reitinger | B60Q 1/323 280/164.1 |
| 2010/0110677 A1* | 5/2010 | Stein | B60Q 1/2611 362/235 |
| 2013/0107525 A1* | 5/2013 | Woodgate | F21K 9/00 362/237 |

(Continued)

FOREIGN PATENT DOCUMENTS

| | | |
|---|---|---|
| CN | 204756786 U | 11/2015 |
| CN | 106152004 A | 11/2016 |

(Continued)

*Primary Examiner* — William N Harris
(74) *Attorney, Agent, or Firm* — Vichit Chea; Carlson, Gaskey & Olds, P.C.

(57) ABSTRACT

A light assembly for a motor vehicle according to an exemplary aspect of the present disclosure includes, among other things, a light source and a lens arrangement. The lens arrangement includes a collimator having an inner surface adjacent the light source and a flat, planar outer surface. This disclosure also relates to a motor vehicle including the subject light assembly, and a method of using the light assembly.

18 Claims, 4 Drawing Sheets

(56) References Cited

U.S. PATENT DOCUMENTS

| | | | |
|---|---|---|---|
| 2013/0170220 A1* | 7/2013 | Bueeler | F21K 9/00 362/296.01 |
| 2014/0036511 A1* | 2/2014 | Whitfield | F21V 27/005 362/311.02 |
| 2015/0219313 A1* | 8/2015 | Marcaly | F21V 5/006 362/309 |
| 2017/0059120 A1* | 3/2017 | Kataoka | F21V 29/74 |
| 2017/0102128 A1* | 4/2017 | Smith | F21V 13/04 |
| 2017/0139223 A1* | 5/2017 | Lauret | G02B 19/0028 |
| 2017/0190282 A1 | 7/2017 | Salter et al. | |
| 2017/0299145 A1* | 10/2017 | Dong | G02B 3/00 |

FOREIGN PATENT DOCUMENTS

| | | |
|---|---|---|
| CN | 106764783 A | 5/2017 |
| EP | 1659027 A1 | 5/2006 |
| WO | 2006047306 A1 | 5/2006 |

\* cited by examiner

LIGHT ASSEMBLY FOR VEHICLE AND METHOD OF USING THE SAME

TECHNICAL FIELD

This disclosure relates to a light assembly for a motor vehicle and a method of using the same.

BACKGROUND

Sport utility vehicles (SUVs) and other vehicles, such as four wheel drive (4WD) vehicles, have a relatively high ground clearance, meaning the floor is at a relatively high elevation above the ground. The increased ground clearance makes it difficult for some users to enter and exit the vehicle.

Running boards are known, and have been used to provide assistance for entering and exiting vehicles with a high ground clearance. Some retractable running board assemblies (sometimes referred to as power running board assemblies or electric running board assemblies) include a running board that is pivotally connected the vehicle by one or more linkages. The linkages are driven by an actuator, which together are configured to move the running board between a retracted position (sometimes referred to as a "stowed" position) and a deployed position. Some vehicles include a light assembly that illuminates the running board in the deployed position, which is useful when a user is entering or exiting the vehicle at night or during low-light conditions.

SUMMARY

A light assembly for a motor vehicle according to an exemplary aspect of the present disclosure includes, among other things, a light source a lens arrangement. The lens arrangement includes a collimator having an inner surface adjacent the light source and a flat, planar outer surface.

In a further non-limiting embodiment of the foregoing light assembly, the lens arrangement comprises a lens, and the collimator is located between the lens and the light source.

In a further non-limiting embodiment of any of the foregoing light assemblies, the outer surface of the collimator is substantially parallel to the lens.

In a further non-limiting embodiment of any of the foregoing light assemblies, the inner surface of the collimator includes a convex surface and first and second walls inclined away from the convex surface.

In a further non-limiting embodiment of any of the foregoing light assemblies, the collimator includes first and second exterior surfaces connecting the first and second walls to the outer surface.

In a further non-limiting embodiment of any of the foregoing light assemblies, the collimator is substantially symmetrical about a centerline when viewed in cross-section.

In a further non-limiting embodiment of any of the foregoing light assemblies, the light assembly further includes a housing. The light source and lens arrangement are mounted within the housing.

In a further non-limiting embodiment of any of the foregoing light assemblies, the light source includes a light emitting diode and a printed circuit board, and at least a portion of the printed circuit board is received in a recess of the housing.

In a further non-limiting embodiment of any of the foregoing light assemblies, the light assembly includes a plurality of light emitting diodes.

In a further non-limiting embodiment of any of the foregoing light assemblies, the collimator is about 12 inches (about 30.48 cm) in length.

In a further non-limiting embodiment of any of the foregoing light assemblies, the collimator is one of a plurality of collimators included in the lens arrangement.

A motor vehicle according to an exemplary aspect of the present disclosure includes, among other things, a running board and a light assembly. The light assembly includes a light source and a lens arrangement configured to direct light from the light source toward the running board. The lens arrangement includes a collimator having an inner surface adjacent the light source and a flat, planar outer surface.

In a further non-limiting embodiment of the foregoing motor vehicle, the lens arrangement comprises a lens, and the collimator is located between the lens and the light source.

In a further non-limiting embodiment of any of the foregoing motor vehicles, the outer surface of the collimator is substantially parallel to the lens.

In a further non-limiting embodiment of any of the foregoing motor vehicles, the inner surface of the collimator includes a convex surface and first and second walls inclined away from the convex surface.

In a further non-limiting embodiment of any of the foregoing motor vehicles, the collimator includes first and second exterior surfaces connecting the first and second walls to the outer surface.

In a further non-limiting embodiment of any of the foregoing motor vehicles, the collimator is substantially symmetrical about a centerline when viewed in cross-section.

In a further non-limiting embodiment of any of the foregoing motor vehicles, the running board is a powered running board moveable between a deployed position and a stowed position.

A method according to an exemplary aspect of the present disclosure includes, among other things, directing light from a light source to a running board using a lens arrangement. The lens arrangement includes a collimator having an inner surface adjacent the light source and a flat, planar outer surface.

In a further non-limiting embodiment of the foregoing method, the running board is a powered running board moveable between a deployed position and a stowed position, and the directing step is only performed when the powered running board is in the deployed position.

DETAILED DESCRIPTION

This disclosure relates to a light assembly for a motor vehicle and a method of using the same. In one example, the light assembly is used to illuminate a running board of a motor vehicle, and includes a light source and a lens arrangement including a collimator. The collimator includes an inner surface adjacent the light source and a flat, planar outer surface. The collimator is configured to direct light to the running board, thereby illuminating the running board, which is useful when a user is entering or exiting the vehicle at night or during low-light conditions. The collimator provides a relatively bright, uniform light onto the running board. Further, due to the collimator, the light source can be a relatively low power light source, which conserves energy while still delivering relatively bright light.

Figure 1:
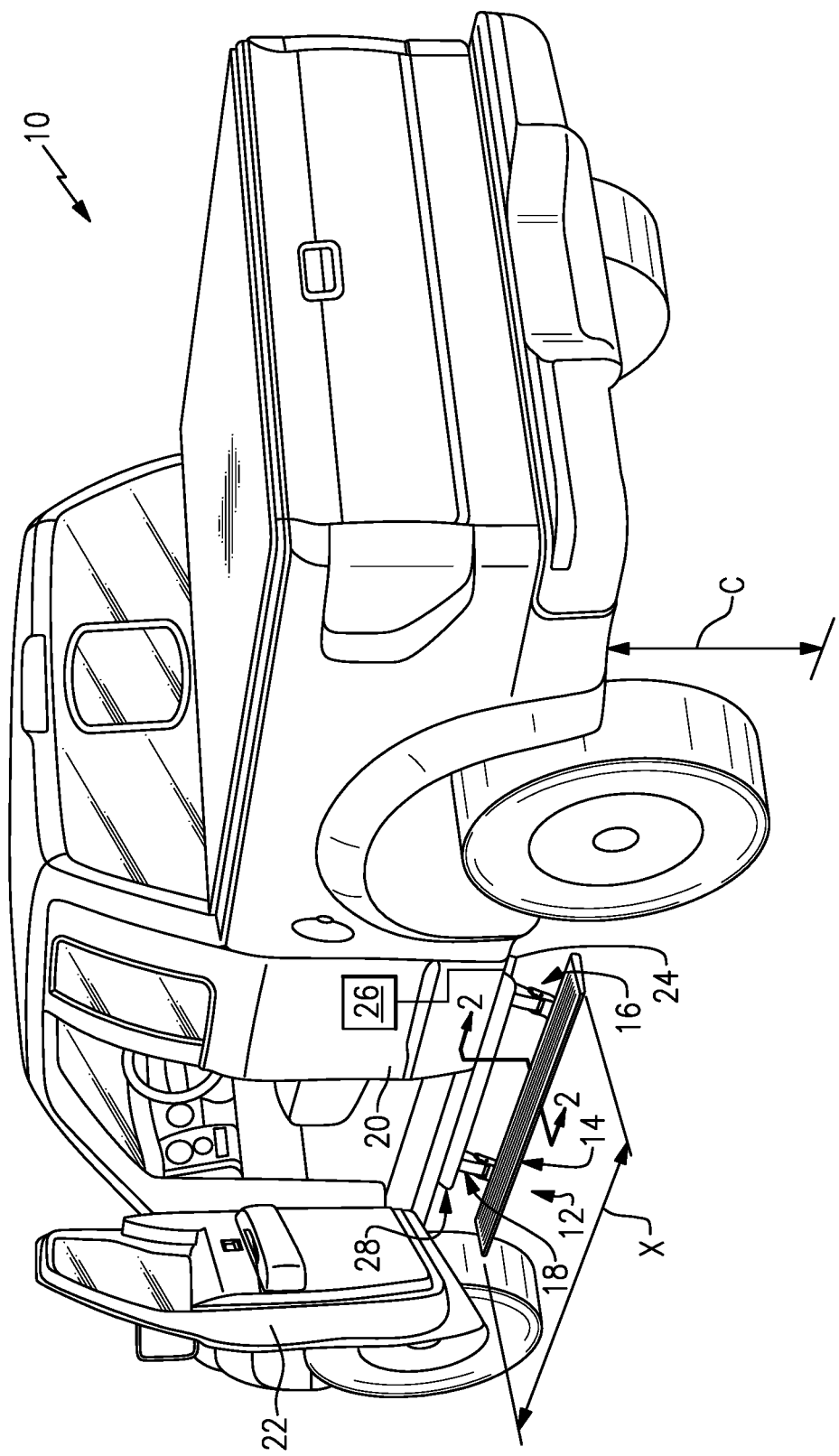
FIG. 1 is a rear-perspective view of a motor vehicle with an example retractable running board assembly and a light assembly.

Referring to the drawings, FIG. 1 is a rear-perspective view of a motor vehicle 10. The vehicle 10 has a relatively high clearance C, which is a distance between a ground surface and a floor of the vehicle 10. As shown, the vehicle 10 is a truck. While a truck is pictured, this disclosure is also applicable to sport utility vehicles (SUVs) and other types of vehicles having a relatively high ground clearance.

The vehicle 10 includes a retractable running board assembly 12 moveable between a deployed position, which is the position shown in FIG. 1, and a retracted position (i.e., a stowed position). In this example, the retractable running board assembly 12 includes a running board 14 and first and second linkages 16, 18 rotatably connecting the running board 14 to a vehicle body 20, which includes the frame and paneling of the vehicle 10. The running board 14 has a length X that at least spans a width of a door 22 of the vehicle 10. When in the deployed position, a user may step on the running board 14 as they enter and exit the vehicle 10.

In this example, the first linkage 16 is directly coupled to a motor 24, which is configured to move the running board 14 between a retracted position and a deployed position. In one example, the motor 24 is in communication with a controller 26, which instructs the motor 24 to move the running board 14 to the deployed position when the door 22 is opened, and further instructs the motor 24 to move the running board 14 to the retracted position when the door 22 is closed.

The controller 26 is shown schematically in FIG. 1. It should be understood that the controller 26 could be part of an overall vehicle control module, such as a vehicle system controller (VSC), or could alternatively be a stand-alone controller separate from the VSC. Further, the controller 26 may be programmed with executable instructions for interfacing with and operating the various components of the vehicle 10. The controller 26 additionally includes a processing unit and non-transitory memory for executing the various control strategies and modes of the vehicle system.

In one example, the motor 24 is an electric motor, and is responsive to instructions from the controller 26 to selectively to adjust a position of the first linkage 16. The second linkage 18 is configured to move in response to movement of the first linkage 16. In other words, the second linkage 18 is a follower linkage. In another example, however, the second linkage 18 could be directly coupled to the motor 24 and the first linkage 16 could be a follower linkage. Further, while two linkages 16, 18 are illustrated in FIG. 1, this disclosure extends to retractable running board assemblies having one or more linkages.

While a retractable running board assembly is shown in FIG. 1, it should be understood that this disclosure extends to running board assemblies that are not retractable. That is, while a two-position (i.e., retracted/stowed and deployed) running board assembly is shown in FIG. 1, it should be understood that this disclosure extends to stationary running boards (i.e., deployed position only).

Figure 2:
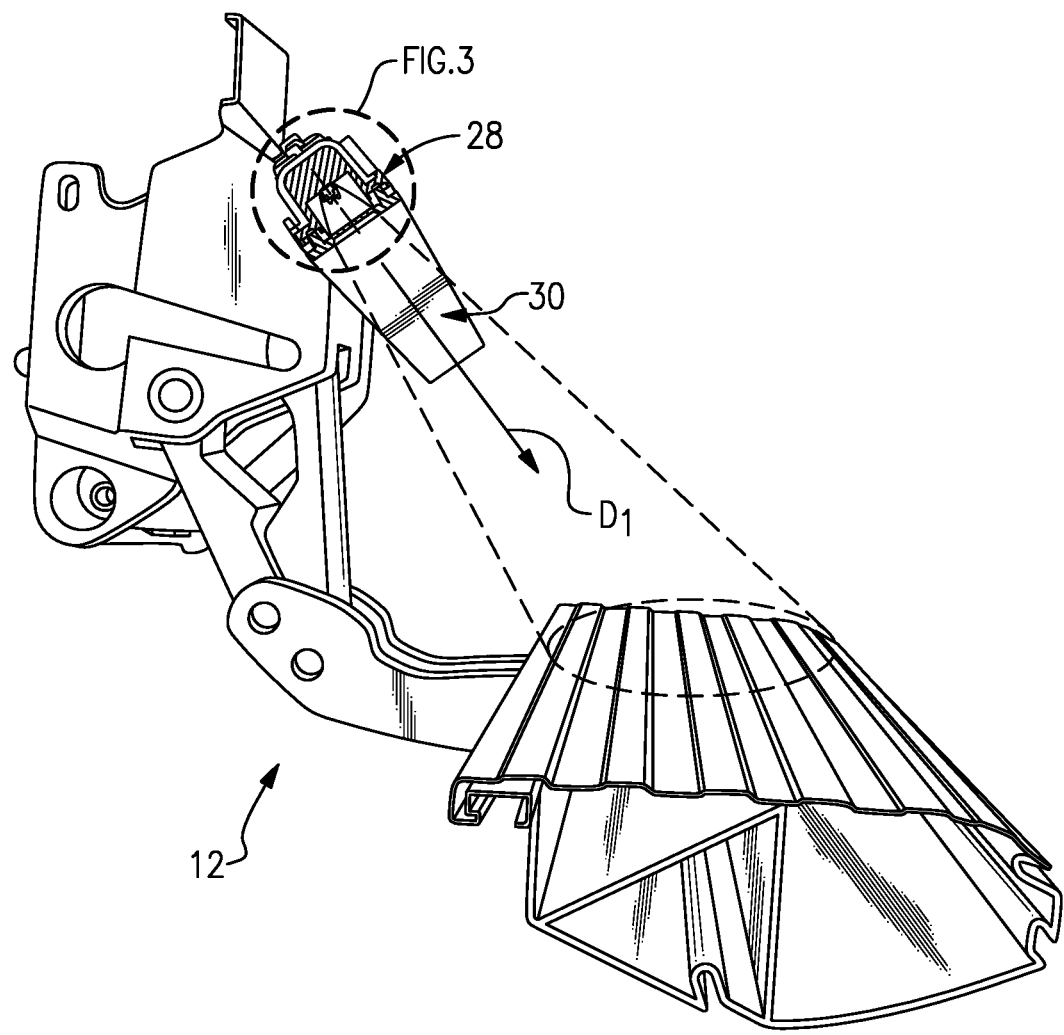
FIG. 2 is a cross-sectional view taken along line 2-2 and illustrates an example retractable running board assembly and a light assembly without the remainder of the vehicle, for purposes of illustration.
Figure 3:
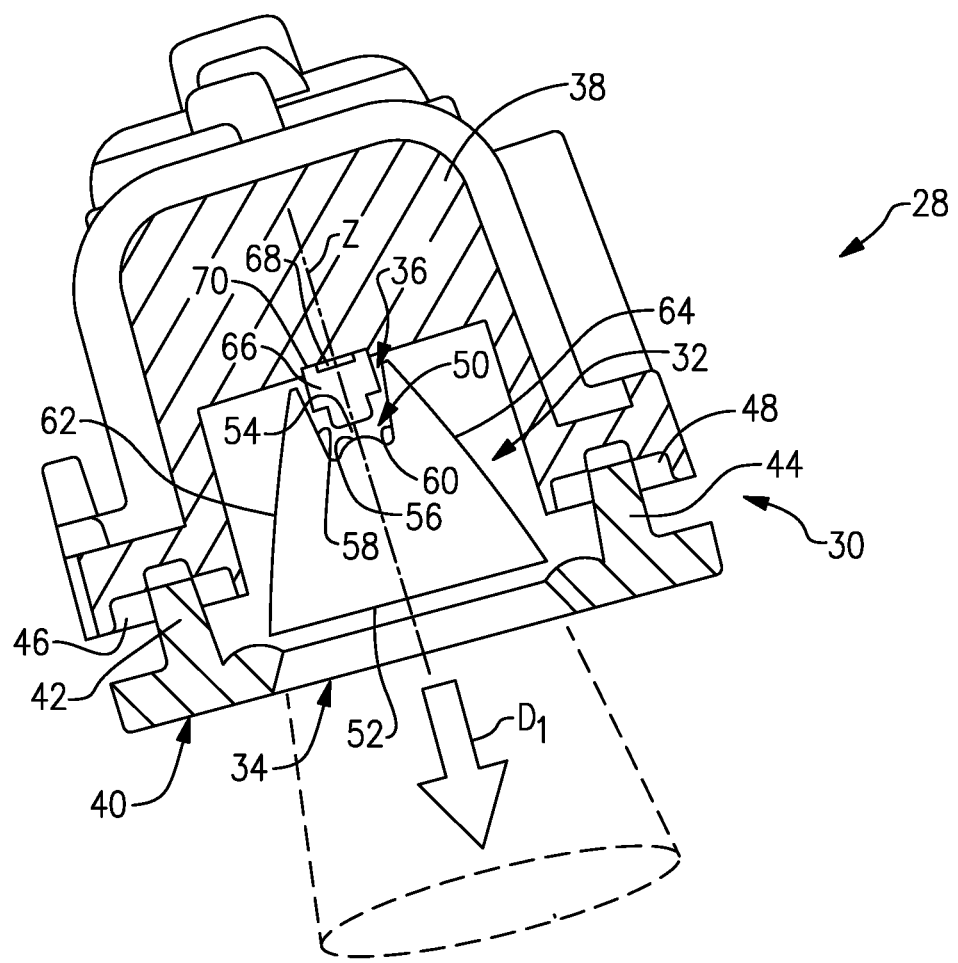
FIG. 3 is a close-up view of the light assembly of FIG. 2.

The vehicle 10 further includes a light assembly 28 (FIG. 2). The light assembly 28 is configured to illuminate the running board 14, which assists the user when entering or entering the vehicle 10 at night or during low light conditions. With reference to FIGS. 2-3, the light assembly 28 includes a lens arrangement 30 having a collimator 32 and an outer lens 34. The lens arrangement 30 is configured to direct light from a light source 36 in a first direction $D_1$ toward the running board 14. It should be understood that certain components of the vehicle 10, including certain aspects of the light assembly 28, are exaggerated in the Figures for purposes of illustration only.

In this example, the light source 36 is controlled by the controller 26. The controller 26 controls the light source 36, in one example, such that the light source 36 is on only when the running board is in the deployed position. Thus, when the running board 14 is in a deployed position, the running board 14 is illuminated. When the running board 14 is retracted, the running board 14 is not illuminated, which conserves power. The controller 26 could control the light source 36 such that it deactivates the light source 36 in certain conditions. It should be understood that this disclosure is not limited to any particular control strategy.

The light assembly 28 includes at least one housing supporting the lens arrangement 30 and the light source 36. Again, in this example, the lens arrangement 30 includes the collimator 32 and the outer lens 34. The collimator 32 is supported by a main housing 38 and the outer lens 34 is supported by a lens housing 40. The lens housing 40 is connected to the main housing 38 by a snap-fit connection, in one example, for ease of assembly. Other attachment techniques come within the scope of this disclosure, however. Specifically, in this example, the lens housing 40 includes flanges 42, 44 and the main housing 38 includes sockets 46, 48 that together provide a snap-fit connection between the main housing 38 and the lens housing 40.

The collimator 32 is located between the light source 36 and the outer lens 34, and is configured to direct light from the light source 36 to the running board 14 in a way that provides bright, uniform light. The disclosed collimator 32 includes an inner surface 50 adjacent the light source 36 and an outer surface 52, which is adjacent the outer lens 34 and generally opposite the inner surface 50.

The inner surface 50 defines a recess 54, and the light source 36 is at least partially arranged in the recess 54. The inner surface 50 includes a convex surface 56, as viewed from the perspective of the light source 36, and first and second walls 58, 60 inclined away from the convex surface 56. The first and second walls 58, 60 are connected by the convex surface 56. The first and second walls 58, 60 are planar, flat surfaces that allow light to pass therethrough Opposite the inner surface 50, the outer surface 52 is a planar, flat surface. In particular, in this example, the entirety of the outer surface 52 is a planar, flat surface, and the outer surface 52 is substantially parallel to the outer lens 34. As such, the outer surface 52 directs light in the direction $D_1$ toward the running board 14. The outer surface 52 is not inclined, as is the case in some known collimators, which are intended to distribute light onto a wall (i.e., provide a wall washer light) laterally spaced from the collimator.

The outer surface 52 is connected to the first and second walls 58, 60 by first and second exterior surfaces 62, 64, respectively. The exterior surfaces 62, 64 are configured to bend light in such a way that the collimator 32 is a total internal reflective collimator, meaning that all light entering the collimator 32 through the inner surface 50 exits through the outer surface 52.

Together, the collimator 32 is substantially symmetrical about a centerline Z. In particular, when viewed in cross-section (e.g., FIG. 3), the centerline Z substantially bisects the convex surface 56 and the outer surface 52. Further, the outer surface 52 is substantially perpendicular to the centerline Z.

The outer lens 34 is transparent and allows light to pass from the collimator 32 to the running board 14. The outer lens 34 is substantially parallel to the outer surface 52 of the collimator 32. Light passing through the outer lens 34 is not reflected or refracted relative to the collimator 32.

While the collimator 32 is illustrated in cross-section in FIG. 3, it should be understood that the collimator 32 may have a length (e.g., extending in-and-out of the page, relative to FIG. 3) of about 12 inches (about 30.48 cm). The collimator 32 may have a length other than 12 inches in some examples. The light assembly 28 may include a plurality of collimators arranged end-to-end to span along the length of the light assembly 28. Likewise, while only one light source 36 is shown in FIG. 3, the light assembly 28 may include a plurality of light sources 36 spaced-apart from one another along the length of the light assembly 28.

The light source 36, in this example, includes a light emitting diode (LED) 66, which is coupled to a printed circuit board (PCB) 68. The PCB 68 is electrically coupled to the controller 26, and the light source 36 is operable in response to instructions from the controller 26. The light source 36 could be provided in a strip or series of LEDs controlled by a single PCB, or could include a plurality of discrete, spaced-apart LEDs, each with their own PCB.

During use, the light source 36 generates heat. In order to dissipate that heat, in this example the main housing 38 includes a recess 70 configured to receive at least a portion of the light source 36. In particular, the recess 70 receives at least a portion of the PCB 68. Thus, the main housing 38 provides a heat sink for the light source 36.

Figure 4:
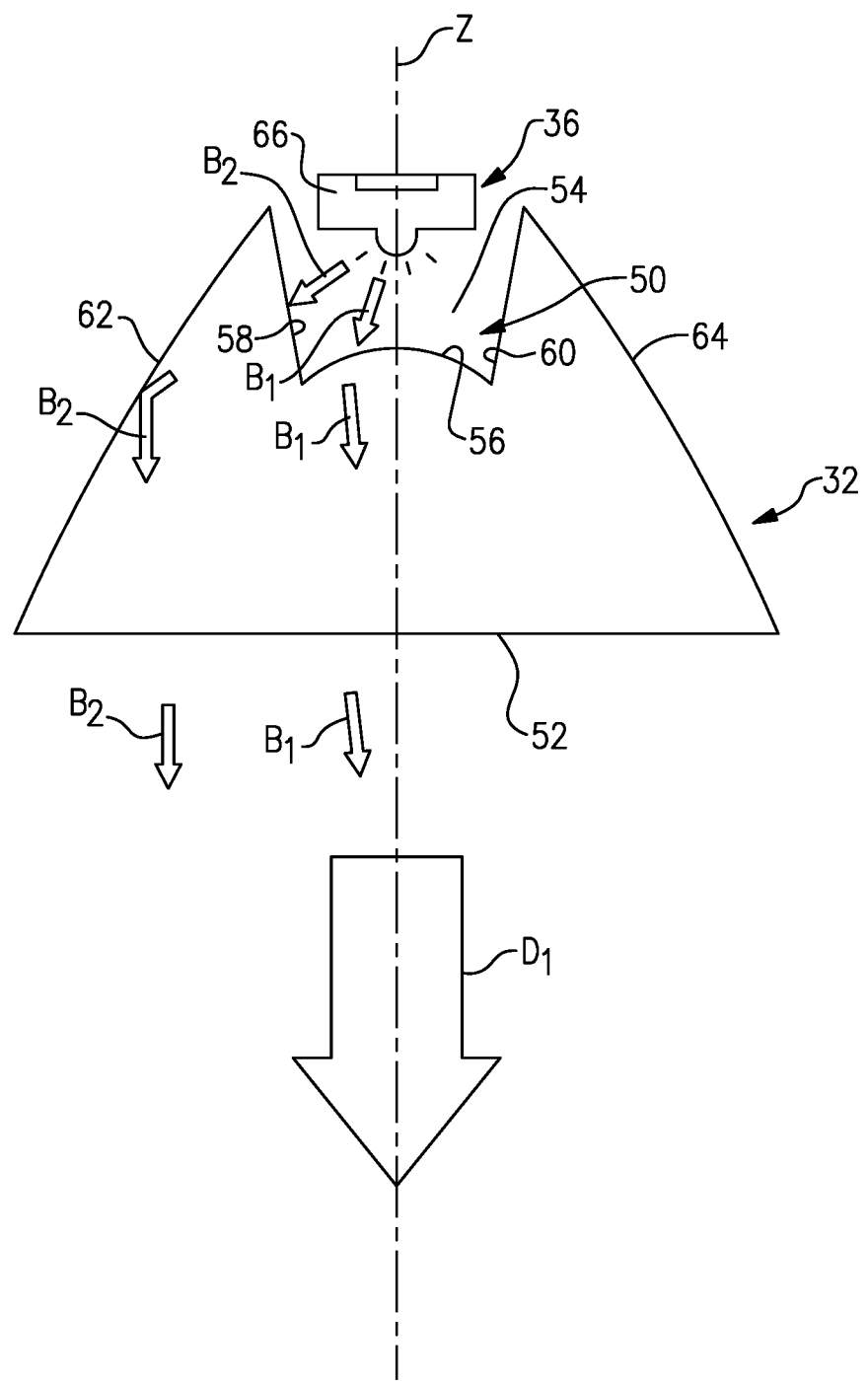
FIG. 4 is a view of the light source and collimator without the remainder of the light assembly for purposes of illustration.

FIG. 4 illustrates the collimator 32 relative to the light source 36 without the remainder of the light assembly 28 for purposes of illustration. As noted above, the collimator 32 is configured to direct light from the light source 36 toward the running board 14 in the direction $D_1$. As noted, the light source 36 may include an LED 66. The LED 66 is configured to emit light in a number of directions. Because the LED 66 is received in the recess 54, the majority of the light emitted from the LED 66 is directed to the inner surface 50 of the collimator 32 (e.g., the convex surface 56, the first wall 58, and/or the second wall 60).

Light beam $B_1$ is representative of a beam of light from the light source 36 that is directed to the convex surface 56. As illustrated in FIG. 4, the light beam $B_1$ is initially directed away from the centerline Z toward the left-hand side of FIG. 4. The convex surface 56 refracts the light beam $B_1$ such that it is directed toward the centerline Z within the collimator 32. When the light beam $B_1$ passes through the outer surface 52, the light beam $B_1$ continues toward the centerline Z. The collimator 32 is arranged such that the light beam $B_1$ intersects the centerline Z adjacent the running board 14. Thus, light that would have otherwise been directed away from the running board 14 illuminates the running board 14 and provides a bright, uniform light.

Light beam $B_2$ is representative of a light beam that is directed through one of the first and second walls 58, 60. In this example, the light beam $B_2$ is emitted from the LED 66 such that it enters the collimator through the first wall 58. The light beam $B_2$ passes through the first wall 58 and is reflected off the exterior surface 62. The exterior surface 62 is arranged such that the light beam $B_2$ is reflected in a direction substantially parallel to the centerline Z. The light beam $B_2$ continues along this path as it travels through the collimator 32 and exits the outer surface 52. As such, light that passes through the first and second walls 58, 60 is directed downward, in a direction substantially parallel to the centerline Z, to illuminate the running board 14.

The collimator 32 of the present disclosure directs an increased amount of light from the light source 36 to the running board 14, which increases brightness. The collimator 32 also generates a unique light pattern on the running board 14, which provides uniform light coverage along the length of the running board 14. Thus, in turn, the collimator 32 increases safety by enhancing a view of the running board 14. The light pattern on the running board 14 can be adjusted by adjusting the shape of the collimator 32.

The collimator 32 allows the light source 36 to be run at a relatively low power, which decreases operating costs, while still adequately illuminating the running board 14. Alternatively, the light source 36 could be provided by a relatively lower-power light source, such as a ½ Watt LED, which decreases the cost of manufacturing the light assembly 28.

While this disclosure is not limited to any particular manufacturing process, the collimator 32 may be made by injection molding. Further, the collimator 32 may be a glass material. Alternatively, the collimator 32 may be made of an acrylic material, or polymethyl methacrylate (PMMAC), as examples.

As mentioned above, the light assembly 28 may include snap-fit components. That is, the collimator 32 may be snap-fit relative to the main housing 38, and the lens housing 40, which includes the outer lens 34, may be snap-fit to the main housing 38. Alternatively, the light assembly 28 is not snap-fit. In that example, the light assembly 28 may be made by a process including one or more overmolding steps.

It should be understood that terms such as "about," "substantially," and "generally" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A light assembly for a motor vehicle, comprising:
   a light source;
   a lens arrangement including a collimator having an inner surface adjacent the light source and a flat, planar outer surface; and
   a housing, the light source and lens arrangement mounted within the housing, wherein the light source includes a light emitting diode and a printed circuit board, wherein at least a portion of the printed circuit board is received in a recess of the housing, wherein the recess is spaced-apart relative to a surface of the housing adjacent the light source, and wherein the surface of the housing adjacent the light source is parallel to a surface of the housing in contact with the printed circuit board.

2. The light assembly as recited in claim 1, wherein the lens arrangement comprises a lens, and wherein the collimator is located between the lens and the light source.

3. The light assembly as recited in claim 2, wherein the outer surface of the collimator is substantially parallel to the lens.

4. The light assembly as recited in claim 1, wherein the inner surface of the collimator includes a convex surface and first and second walls inclined away from the convex surface.

5. The light assembly as recited in claim 4, wherein the collimator includes first and second exterior surfaces connecting the first and second walls to the outer surface.

6. The light assembly as recited in claim 1, wherein, when viewed in cross-section, the collimator is substantially symmetrical about a centerline.

7. The light assembly as recited in claim 1, wherein the light assembly includes a plurality of light emitting diodes.

8. The light assembly as recited in claim 1, wherein the collimator is about 12 inches (about 30.48 cm) in length.

9. The light assembly as recited in claim 8, wherein the collimator is one of a plurality of collimators included in the lens arrangement.

10. A motor vehicle, comprising:
a running board; and
a light assembly including a light source and a lens arrangement configured to direct light from the light source toward the running board, the lens arrangement including a collimator having an inner surface adjacent the light source and a flat, planar outer surface, the light assembly further including a housing, the light source and lens arrangement mounted within the housing, wherein the light source includes a light emitting diode and a printed circuit board, wherein at least a portion of the printed circuit board is received in a recess of the housing, wherein the recess is spaced-apart relative to a surface of the housing adjacent the light source, and wherein the surface of the housing adjacent the light source is parallel to a surface of the housing in contact with the printed circuit board.

11. The motor vehicle as recited in claim 10, wherein the lens arrangement comprises a lens, and wherein the collimator is located between the lens and the light source.

12. The motor vehicle as recited in claim 11, wherein the outer surface of the collimator is substantially parallel to the lens.

13. The motor vehicle as recited in claim 10, wherein the inner surface of the collimator includes a convex surface and first and second walls inclined away from the convex surface.

14. The motor vehicle as recited in claim 13, wherein the collimator includes first and second exterior surfaces connecting the first and second walls to the outer surface.

15. The motor vehicle as recited in claim 10, wherein, when viewed in cross-section, the collimator is substantially symmetrical about a centerline.

16. The motor vehicle as recited in claim 10, wherein the running board is a powered running board moveable between a deployed position and a stowed position.

17. A method, comprising:
directing light from a light source to a running board using a lens arrangement, the lens arrangement including a collimator having an inner surface adjacent the light source and a flat, planar outer surface, wherein the light source includes a light emitting diode and a printed circuit board, wherein at least a portion of the printed circuit board is arranged in a recess spaced-inwardly relative to a surface of a housing adjacent the light source, and wherein the surface of the housing adjacent the light source is parallel to a surface of the recess in contact with the printed circuit board.

18. The method as recited in claim 17, wherein the running board is a powered running board moveable between a deployed position and a stowed position, and wherein the directing step is only performed when the powered running board is in the deployed position.

* * * * *